(12) United States Patent
Marco

(10) Patent No.: US 10,602,493 B2
(45) Date of Patent: Mar. 24, 2020

(54) CELLULAR COMMUNICATION SYSTEM DEVICES AND METHODS

(71) Applicant: TCL Communication Limited, Kowloon (HK)

(72) Inventor: Olivier Marco, Nanterre (FR)

(73) Assignee: TCL COMMUNICATION LIMITED, Tsim Sha Tsui, Kowloon, Hong Kong (CN)

( * ) Notice: Subject to any disclaimer, the term of this patent is extended or adjusted under 35 U.S.C. 154(b) by 0 days.

(21) Appl. No.: 15/464,220

(22) Filed: Mar. 20, 2017

(65) Prior Publication Data

US 2017/0289968 A1    Oct. 5, 2017

(30) Foreign Application Priority Data

Apr. 1, 2016   (GB) ................................... 1605541.0

(51) Int. Cl.
*H04W 72/04* (2009.01)
*H04W 72/12* (2009.01)
*H04W 52/36* (2009.01)
*H04W 72/14* (2009.01)

(52) U.S. Cl.
CPC ....... *H04W 72/042* (2013.01); *H04W 52/365* (2013.01); *H04W 72/0406* (2013.01); *H04W 72/1268* (2013.01); *H04W 72/1294* (2013.01); *H04W 72/14* (2013.01)

(58) Field of Classification Search
CPC ........... H04W 72/042; H04W 72/1268; H04W 72/14
See application file for complete search history.

(56) References Cited

U.S. PATENT DOCUMENTS

| | | | |
|---|---|---|---|
| 7,660,279 | B2 | 2/2010 | Brueck et al. |
| 2009/0221281 | A1* | 9/2009 | Tseng ................ H04W 72/1284 455/423 |
| 2012/0026950 | A1* | 2/2012 | Kotecha ............... H04L 1/0026 370/329 |
| 2012/0178494 | A1* | 7/2012 | Haim .................. H04W 52/365 455/522 |
| 2012/0233481 | A1* | 9/2012 | Henttonen ........... G06F 1/3278 713/323 |
| 2013/0051339 | A1* | 2/2013 | Yang ...................... H04L 5/001 370/329 |

(Continued)

FOREIGN PATENT DOCUMENTS

| | | |
|---|---|---|
| CN | 102316582 A | 1/2012 |
| CN | 102917401 A | 2/2013 |

(Continued)

OTHER PUBLICATIONS

R2-154322 (Long duration UL grant) 3GPP TSG-RAN WG2 meeting #91 LG electronics Oct. 2015.*

(Continued)

*Primary Examiner* — Rina C Pancholi
(74) *Attorney, Agent, or Firm* — Baker & Hostetler LLP

(57) ABSTRACT

A User Equipment has an uplink buffer for storing uplink data to be sent to a base station in an uplink grant procedure and is configured with a DTX (Discontinuous Transmission) pattern which allows it to skip the transmission of uplink padding transmissions when there is a grant but no uplink data in the uplink buffer during 'off' periods.

1 Claim, 3 Drawing Sheets

(56) References Cited

U.S. PATENT DOCUMENTS

| | | | | |
|---|---|---|---|---|
| 2013/0058287 A1* | 3/2013 | Wang | ............... | H04W 72/0406 370/329 |
| 2014/0126402 A1* | 5/2014 | Nam | ................... | H04W 24/08 370/252 |
| 2015/0215825 A1* | 7/2015 | Kim | ................. | H04W 36/0088 370/331 |
| 2015/0264664 A1* | 9/2015 | Kawasaki | ............ | H04W 24/10 370/329 |
| 2015/0359036 A1* | 12/2015 | Seo | ................. | H04W 52/0206 370/329 |
| 2016/0205703 A1* | 7/2016 | Dudda | ................ | H04W 76/38 455/452.1 |

FOREIGN PATENT DOCUMENTS

| | | | | |
|---|---|---|---|---|
| CN | 102986158 A | | 3/2013 | |
| WO | 2012/022369 A1 | | 2/2012 | |
| WO | WO-2012022369 A1 | * | 2/2012 | ............. H04W 8/24 |
| WO | 2016/034193 A1 | | 3/2016 | |
| WO | WO 2017034505 A1 | * | 3/2017 | .......... H04W 72/121 |

OTHER PUBLICATIONS

R2-153490 (L2 Enhancements to reduce latency) 3GPP TSG-RAN WG2 meeting #91 Ericsson Aug. 2015.*
R2-153332 (skipping uplink transmission with no data to transmit) 3GPP TSG-RAN WG2 meeting #91 Samsung Aug. 2015.*
3GPP Draft, "L2 enhancements to reduce latency," R2-153490; RAN WG2; Section 2.2.1, Aug. 24-28, 2015, Mobile Competence Centre, XP051004202.
3GPP Draft, "Long-duration UL grant," R2-154322; RAN WG2; Method 2, p. 2, Oct. 4-9, 2015, Mobile Competence Centre, XP051042355.
CATT: "PDCCH missing issue in skipping UL transmission," 3GPP Draft; R2-154121, 3rd Generation Partnership Project, vol. RAN WG2, No. Malmo, Sweden, Oct. 4, 2015, XP051004721.
Nokia Networks: "Potential protocol enhancement for Fast uplink access," 3GPP Draft; R2-154491, 3rd Generation Partnership Project, vol. RAN WG2, No. Malmo, Sweden, Oct. 4, 2015, XP051005048.
Ericsson: "Skipping padding in SPS-and dynamic grants," 3GPP Draft; R2-154742, 3rd Generation Partnership Project, vol. RAN WG2, No. Malmo, Sweden, Oct. 4, 2015, XP051005231.
Samsung: "Skipping uplink transmission with no data to transmit," 3GPP Draft; R2-153332, 3rd Generation Partnership Project, vol. RAN WG2, No. Beijing, China, Aug. 23, 2015, XP051004073.
Sequans Communications: "Considerations on skipping UL padding transmissions," 3GPP Draft; R2-162735, 3rd Generation Partnership Project, vol. RAN WG2, No. Dubrovnik, Croatia, Apr. 2, 2016, XP051082522.
Extended European Search Report in European Patent Application No. 17163408.2, dated Aug. 31, 2017.

* cited by examiner

CELLULAR COMMUNICATION SYSTEM DEVICES AND METHODS

CROSS-REFERENCE TO RELATED APPLICATIONS

This application claims priority to foreign United Kingdom patent application No. GB 1605541.0, filed on Apr. 1, 2016, the disclosure of which is incorporated by reference in its entirety.

TECHNICAL FIELD

This invention relates to cellular communication devices and methods and is applicable, in particular, to LTE (Long Term Evolution) wireless communication systems.

BACKGROUND

In current LTE systems, an LTE-compatible UE (User Equipment) has to be scheduled by the eNB (eNodeB) to send uplink (UL) data transmissions on PUSCH (Physical Uplink Shared Channel). This is realised by the eNB sending a PUSCH transmission request, also known as an uplink (UL) grant, to the UE. This normally follows an indication by the UE that it has uplink data to send in its buffer. Such uplink grants can be dynamic or configured (periodic). However, the UE sends padding transmissions on PUSCH (Physical Uplink Shared Channel) in an uplink grant procedure if it has no UL (uplink) data in its buffer. This is wasteful of UE battery resource and can add to UL interference.

In order to realise "fast uplink access" it has been considered to use pre-scheduling whereby the eNB allocates uplink grants to the UE without any prior knowledge that the UE has any data to transmit. Typically, a UE can be allocated configured uplink grants for transmission on every subframe. With such a scheme, the UE can transmit as soon as new data arrives in its uplink data buffer, thereby reducing the latency of uplink transmissions. In such cases, most of the time, the UE has no uplink data in its buffer and as a result, it would send only padding transmissions on PUSCH.

Skipping sending useless PUSCH transmissions would be advantageous because it would decrease uplink interference and improve battery efficiency. However skipping PUSCH transmissions may raise operational issues within an LTE system and the present invention proposes methods and devices which take account of such issues.

In legacy (current) LTE UL (uplink) scheduling, there is no possibility for a UE (User Equipment) to skip PUSCH (Physical Uplink Shared Channel) transmissions. New transmissions are scheduled through dynamic or configured (i.e. periodic) grants whereas HARQ retransmissions are scheduled through dynamic UL grant (adaptive retransmissions) or PHICH NACK indication (in the case of non-adaptive retransmissions). Moreover, there is no data-associated UL control information (e.g. TBS, MCS, HARQ process ID, NDI, RV) as this information is basically indicated by the scheduling (or implicitly derived). An eNB (or eNode B) has all the UCI required to process the UE transmission. An eNB may be configured to always assume that the UE has transmitted the PUSCH as intended, and use received PUSCH to update power control loop, adaptive modulation and coding (link adaptation), or timing advance.

However, if a PUSCH transmission is skipped, then the eNB can no longer assume that the UE has performed the scheduled transmission as expected. In the so-called fast uplink access use cases, most of the time a UE would have actually not performed any transmission. Hence, PUSCH transmissions in such cases can be considered as "unsolicited" (meaning: the eNB does not know that there is an actual PUSCH transmission), whereas legacy PUSCH transmissions can be considered as "solicited" (and mandatory-the eNB knows that it can expect a PUSCH transmission). Putting the possibility to skip PUSCH transmissions into effect in a legacy LTE system would have the following impacts.

Firstly, consider HARQ (Hybrid Automatic Repeat Request). The eNB may not be able to reliably perform PUSCH DTX detection. This would lead to the soft buffer being corrupted by noise samples. A consequence can be that HARQ is no longer possible. A very conservative MCS (Modulation and Coding Scheme) may need to be used.

Secondly, consider power control and link adaptation. In cases of SPS (Semi-persistent Scheduling), the PUSCH can be used to adjust power transmission on a short term basis, while PUSCH statistics can be used to adapt the MCS (coding rate). If a PUSCH transmission is skipped, then these capabilities will no longer be possible and as a result, a more conservative MCS may need to be configured. Periodic SRS (Sounding Reference Signal) could be configured as well. However this is not really adapted to the SPS use case but to frequency-selective scheduling, nor is it well adapted to very small bandwidths (minimum SRS BW is 4 RBs, and starting RBs are multiple of 4). Moreover, it would consume additional resources.

Thirdly, consider the PDCCH (Physical Downlink Control Channel). The absence of systematic PUSCH transmissions also means that there will be no confirmation (from the UE to the eNB) that a PDCCH indicating an UL grant (dynamic, or for SPS configuration/release) was correctly received. Hence this may also impact the downlink aggregation level configuration algorithm.

Fourthly, consider 'UE lost' recovery. There is currently (in legacy LTE systems that is), no specific UE-triggered action when a PUSCH does not go through. However, in legacy systems, the eNB can take appropriate action since it has full knowledge of the UL issue. Conversely, when PUSCH transmissions are deliberately skipped, this action to be taken by the eNB would no longer be possible.

Fifthly, consider implicit SPS (Semi-persistent Scheduling) release. The implicit release mechanism whereby the UE autonomously releases the configured SPS resources after N successive UL padding transmissions is no longer applicable.

In one embodiment, the UE is configured with a DTX (Discontinuous Transmission) pattern which is based on a subframe offset, a cycle length and an on-duration expressed in number of subframes, such that a UE is requested to obey PUSCH transmissions requests (even when there is no uplink data) at instants known to the eNB ("on" periods of the DTX pattern) and is allowed to skip UL transmissions (when there is no uplink data) at all other times ("off" periods of the DTX pattern). The offset may be UE specific. This embodiment has the advantages of permitting the eNB to use a legacy adaptation algorithm while still keeping the benefits of skipping UL transmissions most of the time. Padding UL transmissions are therefore skipped only during "off" periods. The DTX pattern may be configured into the UE by appropriate messaging from the eNB. In this way, the eNB knows on which subframes skipping of padding transmissions by a UE is not allowed.

The DTX pattern may be aligned with a DRX (Discontinuous Reception) pattern in order to minimise the UE power consumption and the signaling impact.

In the cases of contention-based (CB) configured or dynamic grants, in addition to a UE specific offset, a DMRS (Demodulation Reference Signal) cycle shift may be applied within a hyper-pattern of the DTX pattern.

In a further embodiment, PHR (Power Headroom Report) is also skipped when skipping of UL padding transmissions is enabled and no UL data is being sent.

The Power Headroom Reporting procedure is normally used during UL transfer to inform the eNB about the difference between the nominal UE maximum transmit power and the estimated power of PUSCH transmission. Typically, a PHR has several possible triggers. One of the possible triggers is the expiration of periodicPHR-Timer, which is used to provide periodical PHR to the eNB. Once triggered, PHR is sent in a TTI (Transmission Time Interval) as soon as UL resources are allocated. In legacy operation, UL resources are basically allocated when there is UL data to be sent. In such cases it makes sense to have PHR sent. When there is no UL data to be sent (e.g., DL only during some time, end of a TX speech burst in VoLTE, . . . ), triggered PHR are actually not transmitted. If skipping of UL padding transmission is enabled, it is not clear if PHR would be sent when no UL data is sent. It depends whether "skipping UL padding transmission" encompasses also transmissions with PHR. On the one hand, this may not be needed as this is not done in legacy systems. On the other hand, this may be considered useful in the sense that it provides periodic UL transmissions which can help in maintaining the UL. For instance, if periodicPHR-Timer is configured, PHR can be sent at least periodically. However, as PHR has no usefulness when no UL data is sent, also avoiding sending PHR under such circumstances provides a further power consumption and UL interference reduction.

In a preferred embodiment, the UE is configured to skip sending PHR when no UL data is sent during 'off' periods dictated by the above-mentioned DTX pattern. During 'on' periods (dictated by the DTX pattern) where skipping PUSCH transmissions is not allowed, the UE obeys legacy requirements and if granted by the eNB, it transmits PHR, if any had been triggered previously. That is to say that the UE is allowed not to transmit PHR on unsolicited PUSCH when no UL data is sent. This option benefits from periodic eNB-aware UL transmissions and reported PHR.

Similarly, in a further embodiment, periodic BSR (Buffer Status Report) is also skipped when skipping of uplink padding transmissions is enabled and no uplink data is being sent.

The Buffer Status Reporting procedure is normally used to inform the eNB about the remaining amount of uplink data to be transmitted within the UE uplink buffer. Typically, a BSR has several triggers. One of the possible triggers is the expiration of periodicBSR-Timer, in which case the BSR is referred to as a "periodic BSR." The periodic BSR is used during uplink data transfer to keep the eNB informed about the UE buffer status. As such, it is transmitted only when the UE has uplink resources allocated. If a UE has no uplink resources allocated, it is just postponed and does not trigger a scheduling request procedure, contrary to "regular BSR."

In a preferred embodiment, the UE is configured to skip sending periodic BSR when no uplink data is sent during "off" periods dictated by the above-mentioned DTX pattern. During "on" periods (dictated by the DTX pattern) where skipping PUSCH transmissions is not allowed, the UE obeys legacy requirements and if granted by the eNB, transmits periodic BSR, if any had been triggered previously. That is to say that the UE is allowed not to transmit periodic BSR on unsolicited PUSCH when no uplink data is sent. This option benefits from periodic eNB-aware uplink transmissions and reported BSR.

A further embodiment takes into account the handling of a lost UE. Typically, this can occur when the UE has moved towards the edge of a cell. It can also be due to the time alignment being lost. In current systems (legacy operation), if a UE needs to transmit UL data, and there are no scheduled resources available, the UE uses SR (Scheduling Request) (if time aligned) or PRACH (if not time aligned). In either case, the UE notifies upper layers in cases of failure. Typically, a SR procedure failure will trigger a PRACH procedure, and a PRACH procedure failure will trigger a radio link failure (RLF) procedure from RRC. As the eNB is not aware that the UE is transmitting, failure handling is important at the UE side in order to solve the issue.

In cases where there are scheduled resources available, the UE can transmit data on PUSCH. The eNB is responsible for requesting HARQ retransmissions when required. However, in cases where the maximum number of HARQ retransmissions is reached on the UE side, there is no specific action at MAC level. The transmission goes on with a new transport block. RLC AM bearers will eventually reach a maximum number of retransmissions, and trigger a RLF. But if there are only RLC UM bearer(s), then no RLF is triggered at all. As the eNB is aware that UE is transmitting in this case, failure handling is less important at the UE side since the eNB can detect UL issues and take appropriate actions.

With configured UL grant every subframe, a UE is always in the "scheduled resources available" use case and does not use SR procedure. Instead, PUSCH is used. If skipping of UL padding transmission is enabled, then the eNB is not aware that the UE is transmitting. Then, if UL is lost, eNB will not take any action since it is unaware of it and as per the current LTE specification, neither will the UE; in cases where RLC UM bearer is used, the UE may go on transmitting until TAT (Time Alignment Timer) expiry. Such timer could typically be set to a high value in order to avoid unnecessary timing advance updates.

These issues relating to a lost UE are resolved by the provision of the DTX pattern as described above. This is because the eNB would notice that the UL connection had been lost by no longer decoding solicited PUSCH on mandatory occasions.

In an embodiment where only unsolicited UL PUSCH transmissions are possible; that is, the DTX pattern is not configured in the UE, and the UE is allowed to skip uplink padding transmissions on an allocated uplink resource, then the UE may be configured to autonomously release any "skipping UL padding transmission" enabled resources upon noticing that the PUSCH transmissions are not successful. An option is to configure the autonomous release to occur after a given number of unsolicited PUSCH transmission failures. This would result in a reversion to the legacy operation involving SR, PRACH (Physical Random Access Channel) and RLF procedures. Reception of a SR/PRACH transmission by the eNB may serve as an indication that the UE has released the SPS resources. The eNB can then recover the situation and allocate appropriate resources to the UE.

In other cases where dynamic grants are used for pre-scheduling, it is assumed that this would not be on a per-TTI/long term basis. Hence, the issue of unsolicited PUSCH transmissions not seen by the eNB may be less critical. Indeed, the UE can be expected to still send some SRs, which could be detected by the eNB. In one embodiment, the UE may be configured to ignore at least some UL grants and instead, send (SR) Scheduling Requests, at least until detecting a change in MCS/power control in the UL grants. An eNB receiving a SR on TTIs on which an unsolicited PUSCH was scheduled (hence on which the UE should not have transmitted SR) can interpret it as an issue with unsolicited PUSCH and take appropriate actions.

The way that a UE can determine an unsolicited PUSCH transmissions issue depends on an agreed scheme for HARQ feedback. PHICH is strongly encoded, and the NACK-ACK errors are expected to be low. Alternatively, ACK feedback through PDCCH can provide more reliability in the determination that PUSCH transmission was successful.

The UE may be configured to autonomously release the configured resource after a specified duration of time has elapsed (or number of resources) since the activation.

It will be appreciated that the implicit release of SPS resources after N successive UL padding transmissions in legacy systems will no longer apply if PUSCH transmissions are skipped. Having a mechanism to implicitly release the SPS resources could also be useful to mitigate UL lost issue impact. It should be also noted that once SPS is configured by RRC, it could be accidentally started on a false PDCCH detection, in which case the eNB is not even aware a UE is transmitting (on a randomly selected resource). At least in legacy operation, the configured resource would be released once UE has no UL data to send. However, this would not be the case if PUSCH transmissions are skipped. A possible solution would be to limit the number of pre-allocated resources to a given amount M (fixed or configured), or equivalently to release the configured resource after M successive periods.

SUMMARY OF THE INVENTION

There is also provided a method for operating a wireless communication device in communication with a network element of a cellular communication system, the method comprising the step of the network element transmitting an indication in a DCI (Downlink Control Information) signal to a wireless communication device which is in communication with the network element, wherein the indication instructs the wireless communication device to skip sending uplink padding transmissions for a given uplink grant for dynamic scheduling grant.

The wireless communication device may have an uplink buffer for storing uplink data to be sent to the network element in an uplink grant procedure, the method further comprising skipping the transmission of uplink padding transmissions from the wireless communication device to the network element when there is a grant but no uplink data in said uplink buffer, and releasing any configured uplink resources after expiry of a predetermined period of time following activation of such configured uplink resources.

There is also provided a method for operating a wireless communication device in communication with a network element of a cellular communication system, wherein the wireless communication device has an uplink buffer for storing uplink data to be sent to the network element in an uplink grant procedure, the method comprising skipping the transmission of periodic Buffer Status Reports from a wireless communication device to a network element to which the wireless communication device is connected, when skipping of uplink padding transmissions is enabled and no uplink data is being sent.

BRIEF DESCRIPTION OF THE DRAWINGS

Some embodiments of the invention will now be described with reference to the drawings of which.

DETAILED DESCRIPTION

Figure 1:
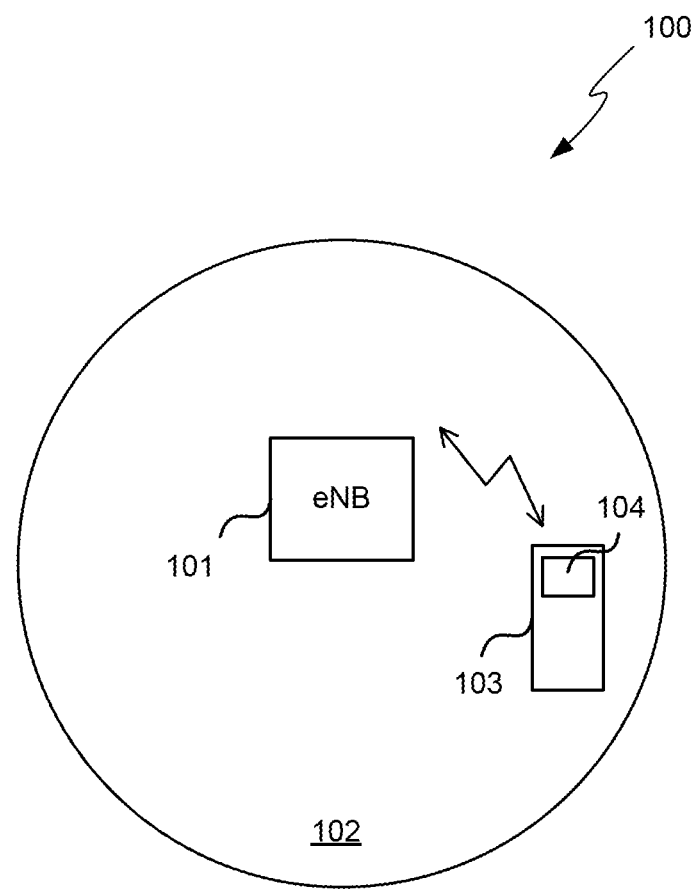
FIG. 1 is a schematic diagram of components of a cellular communication system operable in accordance with the invention.

Referring to FIG. 1, an example of part of a wireless communication network operating in accordance with embodiments of the invention is illustrated and indicated generally at 100 and comprises an evolved Node B (eNB) 101 supporting an LTE cell 102. In other embodiments, the eNB 101 may support a multiplicity of cells. The evolved Node B 101 comprises a part of a radio access network which in this example is an E-UTRAN. A User Equipment 103 is located within the area of coverage of the cell 102. The User Equipment 103 has an uplink buffer 104 for storing uplink data to be sent to the eNB 101.

In a first embodiment, if there is no data in the uplink buffer 104 for sending to the eNB as part of an uplink grant procedure, then the UE 103 does not send any PUSCH padding transmissions to the eNB 101. In one example of operation, the UE 103 is configured to permanently exhibit this behaviour. In another example, the UE 103 exhibits this behaviour for a predetermined duration of time while it is connected to the network 100 and then for further predetermined time period reverts to the conventional behaviour of sending padding transmissions when appropriate.

In a second embodiment and for dynamic scheduling grants, the eNB 101 sends an indication in the DCI (Downlink Control Information) which instructs the UE 103 to skip sending uplink padding transmissions for a given uplink grant.

Figure 2:
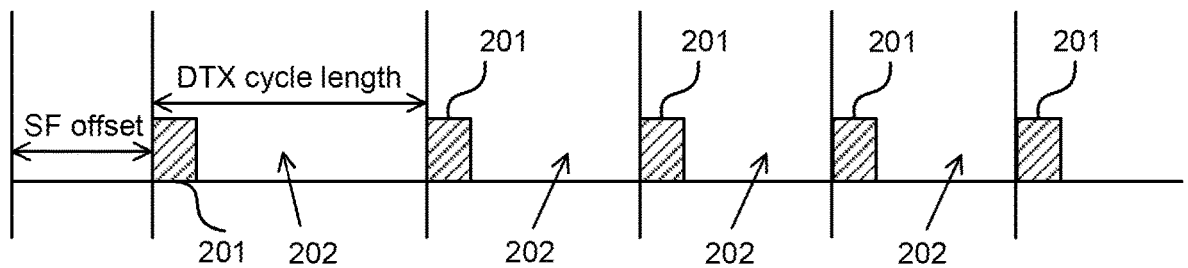
FIG. 2 represents a DTX pattern.

In a third embodiment and for configured or dynamic grants, the eNB 101 sends a DTX pattern to the UE 103. As a result, the UE 103 is configured with the received DTX pattern which in one example, is based on a subframe offset, cycle length and on-duration in a similar way to an existing C-DRX (Connected Discontinuous Reception) pattern. The UE 103 is thus configured such that it skips sending uplink padding transmissions during 'off' periods if it is granted uplink resources but there is no data in the uplink buffer. Typically, a periodicity of 40 ms with an 'on' duration of 1 ms could be used, as this would match the typical pattern for VoLTE. However, a longer periodicity may be used in order to limit the impact on power consumption. Skipping such uplink transmissions is allowed only in 'off' periods, whereas during 'on' periods the UE 103 obeys uplink grants as in legacy systems. If the DTX pattern is aligned with the DRX pattern, then the power consumption and the signaling impact can be minimised. FIG. 2 illustrates the DTX pattern having 'on' periods 201 and 'off' periods 202. There is one 'on' period and one 'off' period per DTX cycle length. During each 'on' period 201, if uplink resource is allocated (dynamic or configured uplink grant), skipping an uplink padding transmissions is forbidden. During each 'off' period

202 however, if uplink resource is allocated (dynamic or configured uplink grant), skipping an uplink padding transmissions is allowed.

Figure 3:
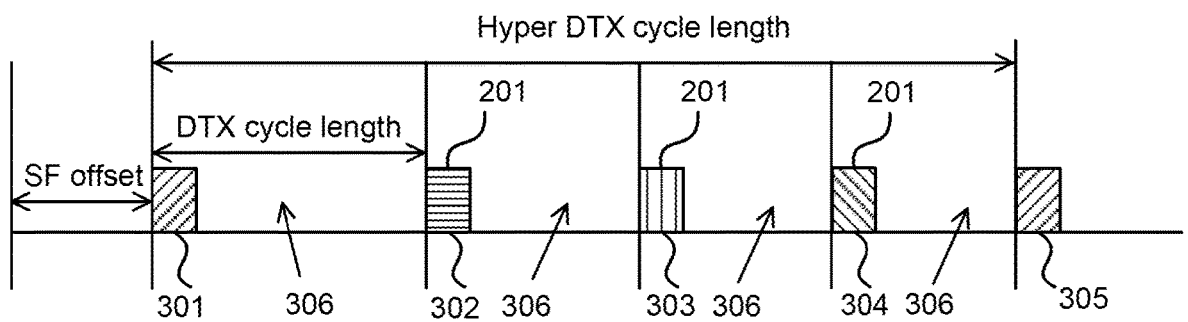
FIG. 3 represents a DTX pattern including a hyper-pattern.

The scheme described above with reference to the third embodiment can be extended to contention based (CB) configured or dynamic grants. Such grants can address several UEs at the same time and enable such UEs to transmit on the same UL resources. Typically, different DMRS (Demodulation Reference Signal) cycle shifts are used to allow discrimination in cases of simultaneous transmissions Thus, in a fourth embodiment a DMRS (Demodulation Reference Signal) cycle shift is used as an additional UE-specific offset within a hyper pattern of the DTX pattern. FIG. 3 illustrates the DTX pattern with a hyper pattern whose cycle length is four DTX cycle lengths. In this example, four User Equipments (A,B,C,D) are configured on the same resource. Each User Equipment is forbidden to skip the PUSCH transmissions during one of every four 'on' periods of each DTX cycle and is forbidden to make any PUSCH transmissions on the remaining three 'on' periods which are contained within the DTX hyper pattern cycle length. With reference to FIG. 3, during 'on' period 301, if uplink CB resource is allocated (dynamic or configured uplink grant) then the resource is reserved for Use Equipment A and skipping of padding transmissions is not allowed during this period by User Equipment A. Transmissions are forbidden for the other User Equipments (B,C,D) during this period 301. During 'on' period 302, if uplink CB resource is allocated (dynamic or configured uplink grant) then the resource is reserved for Use Equipment B and skipping of padding transmissions is not allowed during this period by User Equipment B. Transmissions are forbidden for the other User Equipments (A,C,D) during this period 302. During 'on' period 303, if uplink CB resource is allocated (dynamic or configured uplink grant) then the resource is reserved for Use Equipment C and skipping of padding transmissions is not allowed during this period by User Equipment C. Transmissions are forbidden for the other User Equipments (A,B,D) during this period 303. During 'on' period 304, if uplink CB resource is allocated (dynamic or configured uplink grant) then the resource is reserved for Use Equipment D and skipping of padding transmissions is not allowed during this period by User Equipment D. Transmissions are forbidden for the other User Equipments (A,B,C) during this period 304. During 'off' periods 305, if uplink CB resource is allocated (dynamic or configured uplink grant) skipping of uplink padding transmissions is allowed for all User Equipments A,B,C,D. The hyper DTX cycle then repeats, starting with 'on' period 306 which is reserved for User Equipment A. Such a scheme enables the eNB to configure separate periodic solicited PUSCH transmissions opportunities to each of the contending UEs. In these third and fourth embodiments, by use of the DTX pattern, the eNB is allowed to know when uplink padding transmission skipping, by a particular User Equipment, is or is not allowed.

The invention claimed is:

1. A method for operating a wireless communication device in communication with a network element of a cellular communication system, wherein the wireless communication device has an uplink buffer for storing uplink data to be sent to the network element in an uplink grant procedure, the method comprising:
   skipping transmission of periodic Buffer Status Reports from the wireless communication device to the network element to which the wireless communication device is connected, when skipping of uplink padding transmissions is enabled and no uplink data is being sent, wherein periodic Buffer Status Reports are triggered by the expiration of periodic BSR-Timer, and
   wherein the skipping of uplink padding transmissions is enabled based on:
      the network element transmitting an indication in a DCI (Downlink Control Information) signal carried on PDCCH (Physical Downlink Control Channel), EPDCCH (Enhanced Physical Downlink Control Channel), or MPDCCH (Machine type communications Physical Downlink Control Channel) to the wireless communication device which is in communication with the network element,
   wherein the indication instructs the wireless communication device to skip sending uplink padding transmissions for a given uplink grant scheduled by the DCI for dynamic scheduling grant based in part on adaptive modulation and coding.

\* \* \* \* \*